Aug. 29, 1944.  G. O. JOYNER ET AL  2,357,008
CAM ADJUSTING DEVICE
Original Filed April 13, 1940   2 Sheets-Sheet 1
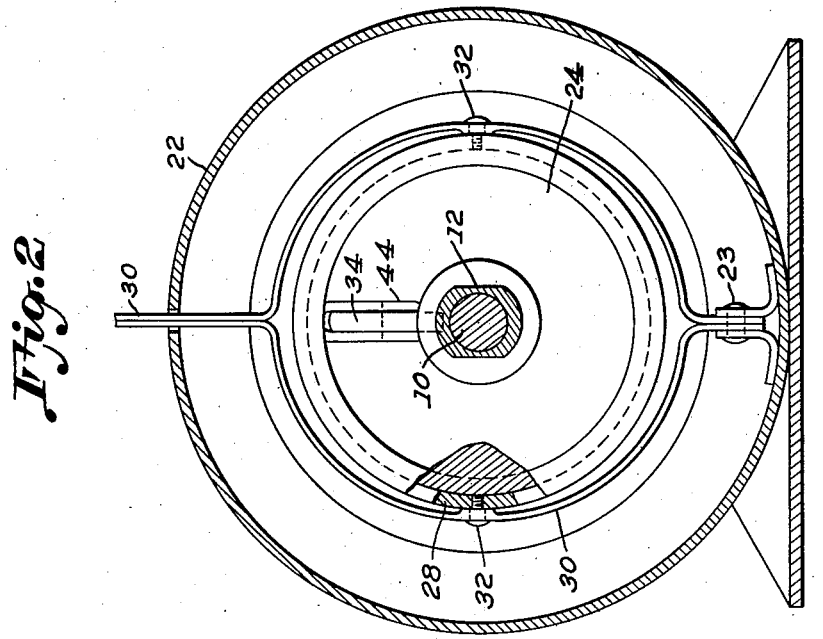
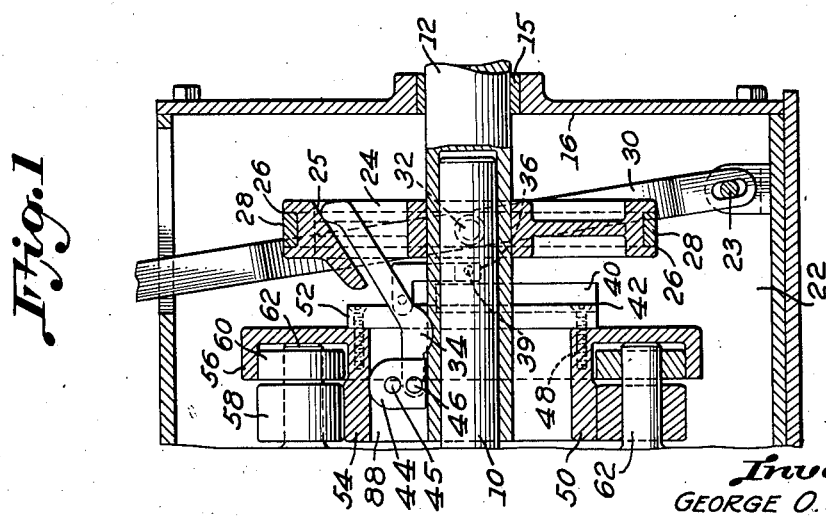
Inventors.
GEORGE O. JOYNER
DONALD SCOTT MYERS
By Roy M. Eilers
Attorney.

Aug. 29, 1944.   G. O. JOYNER ET AL   2,357,008
CAM ADJUSTING DEVICE
Original Filed April 13, 1940   2 Sheets-Sheet 2

Inventors:
GEORGE O. JOYNER
DONALD SCOTT MYERS

By Roy M. Eilers
Attorney.

Patented Aug. 29, 1944

2,357,008

UNITED STATES PATENT OFFICE 2,357,008

CAM ADJUSTING DEVICE

George O. Joyner, St. Louis, and Donald Scott Myers, Kirkwood, Mo.

Original application April 13, 1940, Serial No. 329,465. Divided and this application August 14, 1941, Serial No. 406,924

3 Claims. (Cl. 74—568)

This invention is a division of our co-pending application, Serial Number 329,465, filed April 13, 1940, which has been issued as Patent No. 2,256,903.

This invention relates to improvements in cam adjusting devices. More particularly, the invention relates to cam adjusting devices that are mounted on and rotatable with a rotatable shaft.

Other objects and advantages of the invention will be shown and described in the drawings and accompanying description.

In the drawings, I show a preferred embodiment of my invention, but I do so only for the sake of convenience, and it is to be understood that the drawings and accompanying description do not limit the invention and that the invention will be defined by the appended claims.

Fig. 1 of the drawings is a view of the elements of the preferred form of cam adjusting device as they are assembled in operative relation.

Fig. 2 is an end view of one portion of the cam adjusting device.

Figure 3:
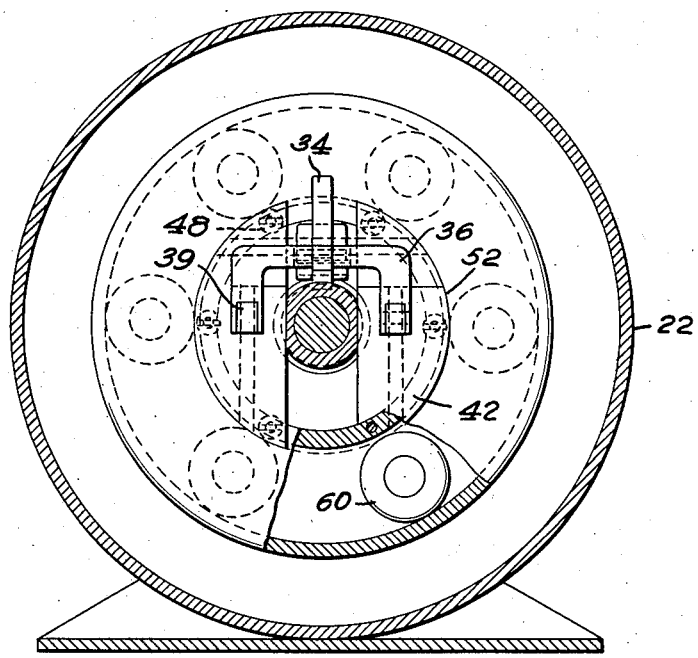
Fig. 3 is an end view of the counterweight used in the cam adjusting device.
Figure 4:
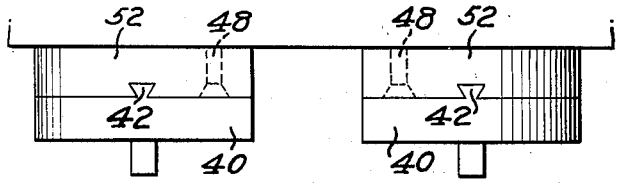
Fig. 4 shows the configuration of the grooves in the cam plate and the projections on the counterweight.

Referring to the drawings in detail, the preferred embodiment of the invention may be regarded as the aggregation of a number of elements. These elements may roughly be designated as a casing and a driving mechanism. The casing comprises a main section 22 and an end plate 16 that is secured to the main section 22 by bolts 20. The driving mechanism is mounted on drive shaft 12 and is rotatable therewith. The driving mechanism comprises a collar 24 and a cam 50. The drive shaft 12 is journaled in bearing 15 in end plate 16 and is rotatably supported on rotatable shaft 10. The collar 24 is so associated with the shaft 12 that the collar 24 may be moved longitudinally on the shaft 12, while the collar and shaft rotate together. This association can be secured in a number of ways, but the present embodiment uses a shaft having flat portions milled thereon, and a collar having a hub section complementary to the cross-section of the shaft. The collar 24 has a groove 26 in its outer periphery in which a ring 28 is held. The engagement between the ring 28 and the groove 26 is loose enough to permit rotation of the collar 24 without rotation of the ring 28. The ring 28 is secured to a lever 30 by pins 32. The lever 30 is rotatably attached to the main section 22 of the casing by a stud and pin 23. The free end of lever 30 extends through the main section 22 of the casing and may be operated by manual or other means not shown. The collar 24 is provided with an inclined inner face or surface 25. This inclined face 25 engages one arm of lever 34. Lever 34 has a rounded portion which fits in a groove in shaft 12 and acts as a fulcrum for lever 34. A lever 36 is attached to lever 34 by pin 38. The lever 36 is connected to a movable counterbalancing weight 40 by pin 39. A lever 44, connected to lever 34 by pin 46, bears against the inner surface of cam 50. The lever 44 in this embodiment of the invention consists of two parts held together by pins 45 and 46. Secured to cam 50 by suitable means, such as machine screws 48, is a cam plate 52. In the central portion of the cam plate 52 is a longitudinal opening. This opening is so dimensioned that the sides thereof engage flat portions milled on the shaft 12 and cause the cam to rotate with the shaft. The opening is long enough to permit the movement of cam 50 in a plane perpendicular to the axis of shaft 12. This permits the eccentricity of the cam to be changed at will. Grooves may be machined in the cam plate 52 to serve as guides for the counterbalancing weight 40. Projections 42 on the counterbalancing weight 40 engage the grooves in the cam plate 52, and guide the movement of the counterbalancing weight 40 relative to the cam plate 52. The cam has two bearing surfaces 54 and 56. These bearing surfaces engage rollers 58 and 60 which are mounted on shaft 62.

The driving cam 50 is a circular cam which may rotate eccentrically or concentrically with respect to the axis of shaft 12. When cam 50 rotates concentrically, no force is transmitted from the driving shaft to the shafts 62. Cam 50 is provided with two bearing surfaces 54 and 56. Surface 54 causes the rollers on shaft 62 to move outwardly, while surface 56 causes the rollers on shaft 62 to move inwardly. These surfaces make cam 50 a positive follower cam. When the cam is moved by levers 34 and 44, which are actuated by movement of collar 24, one portion of its periphery will be farther from the center of the shaft than other portions. As this portion of the cam moves in its orbit, the shafts 62 will move outwardly. As the low portion of the periphery of the cam moves in its orbit, the shaft 62 is forced to move inwardly.

The eccentricity of the cam 50 is adjusted by movement of lever 30. The lever 30 is pivotally connected to a ring 28 which engages a groove 26 in collar 24. As the lever is moved, the collar 24 slides along the shaft 12, and this can be done while the shaft 12 is rotating. The movement of collar 24 causes the inclined face 25 thereon to engage the end of lever 34, and continued movement of the collar 24 causes rotation of the lever 34. The rotation of lever 34 displaces the cam 50 and displaces the counterweight 40. The counterweight 40 is so designed that any movement of the cam 50 is compensated for automatically by movement of the counterweight 40, and constant dynamic balance is maintained.

What we claim is:

1. In a cam adjusting device, the combination of a frame, a rotatable shaft, a cam, a counter balance, and cam moving means including a lever, a collar, a sleeve and a handle, said cam being mounted on and being rotatable with said rotatable shaft, said cam and said rotatable shaft being locked together in such a manner that said cam can be moved radially of said rotatable shaft but cannot be rotated relative to said rotatable shaft, said lever being supported by and being rotatable with said rotatable shaft, said collar being rotatable with said cam and said lever and being movable to actuate said lever and thereby change the eccentricity of said cam, said sleeve being in sliding engagement with said collar and being movable by said handle, said counterbalance being associated and rotatable with said cam, and said counterbalance being arranged to maintain automatically the dynamic balance of the cam adjusting device irrespective of the eccentricity of the cam.

2. In a cam adjusting device, the combination of a frame, a rotatable shaft, a cam, a counter balance, and cam moving means including a lever, a collar, and a handle, said cam being mounted on and being rotatable with said rotatable shaft, said cam and said rotatable shaft being locked together in such a manner that said cam can be moved radially of said rotatable shaft but cannot be rotated relative to said rotatable shaft, said lever being supported by and being rotatable with said rotatable shaft, said lever being positioned between said cam and said shaft and constituting the principal means of maintaining said cam in an eccentric position, said collar being rotatable with said cam and said lever and being movable to actuate said lever and thereby change the eccentricity of said cam, said collar being movable by said handle, said counter balance being associated and rotatable with said cam, and said counter balance being arranged to maintain automatically the dynamic balance of the cam adjusting device irrespective of the eccentricity of the cam.

3. In a cam adjusting device, the combination of a frame, a rotatable shaft, a cam, a counter balance, and cam moving means including a lever, a collar, a sleeve and a handle, said cam being mounted on and being rotatable with said rotatable shaft, said cam and said rotatable shaft being locked together in such a manner that said cam can be moved radially of said rotatable shaft but cannot be rotated relative to said rotatable shaft, said cam being unitary in character whereby all parts thereof move as a unit, said lever being supported by and being rotatable with said rotatable shaft, said lever being positioned between said cam and said shaft and constituting the principal means of maintaining said cam in an eccentric position, said collar being rotatable with said cam and said lever and being movable to actuate said lever and thereby change the eccentricity of said cam, said sleeve being in sliding engagement with said collar and being movable by said handle, said counter balance being associated and rotatable with said cam, and said counter balance being arranged to maintain automatically the dynamic balance of the cam adjusting device irrespective of the eccentricity of the cam.

GEORGE O. JOYNER.
DONALD SCOTT MYERS.